United States Patent [19]

Kamataki

[11] Patent Number: 5,756,987
[45] Date of Patent: May 26, 1998

[54] PHOTOELECTRIC DISPLACEMENT DETECTOR HAVING MOVABLE DETECTING ELEMENTS

[75] Inventor: Kimihiko Kamataki, Chiba, Japan

[73] Assignee: Technical System Co., Ltd., Osaka, Japan

[21] Appl. No.: 750,749
[22] PCT Filed: Aug. 30, 1996
[86] PCT No.: PCT/JP96/02477
  § 371 Date: Dec. 24, 1996
  § 102(e) Date: Dec. 24, 1996
[51] Int. Cl.[6] ................................................ H01J 40/14
[52] U.S. Cl. .................................. 250/206.2; 250/559.3; 356/3.06
[58] Field of Search ........................ 250/206.2, 206.1, 250/559.3, 231.1, 559.26, 559.32; 356/32, 3.12, 3.08, 3.06, 34, 373, 375; 340/555–557; 73/787, 789, 794, 795

[56] References Cited

U.S. PATENT DOCUMENTS 4,269,512  5/1981  Nosler .............................. 250/559.3

FOREIGN PATENT DOCUMENTS 59-170715  9/1984  Japan .
4-178514   6/1992  Japan .
5-60560    3/1993  Japan .

*Primary Examiner*—Que Le
*Attorney, Agent, or Firm*—Sixbey, Friedman, Leedom & Ferguson, P.C.; Gerald J. Ferguson, Jr.

[57] ABSTRACT

An improved photoelectric displacement detector is disclosed which includes (a) a light receiving part (1) having a pair of solar battery panels (1b, 1c) vertically arranged adjacent to each other, (b) a vertical motion mechanism (2) which is driven by a motor (3) to vertically linear-shift the light receiving part (1), (c) a vertical light quantity difference detection part (4) for detecting, based on signals from the solar battery panels (1b, 1c), a difference between the quantity of light received in the solar battery panel (1b) and the quantity of light received in the solar battery panel (1c) and (d) a CPU (5) for controlling the operation of the motor (3) according to the received light quantity difference detected by the vertical light quantity difference detection part (4). Reference laser light is sent onto the light receiving part (1) and the light receiving part (1) is vertically shifted in order that the aforesaid received light quantity difference is cancelled to zero. The amount of motion of the light receiving part (1) at the time when the aforesaid received light quantity difference is cancelled to zero, is determined by a rotary encoder (6).

7 Claims, 8 Drawing Sheets

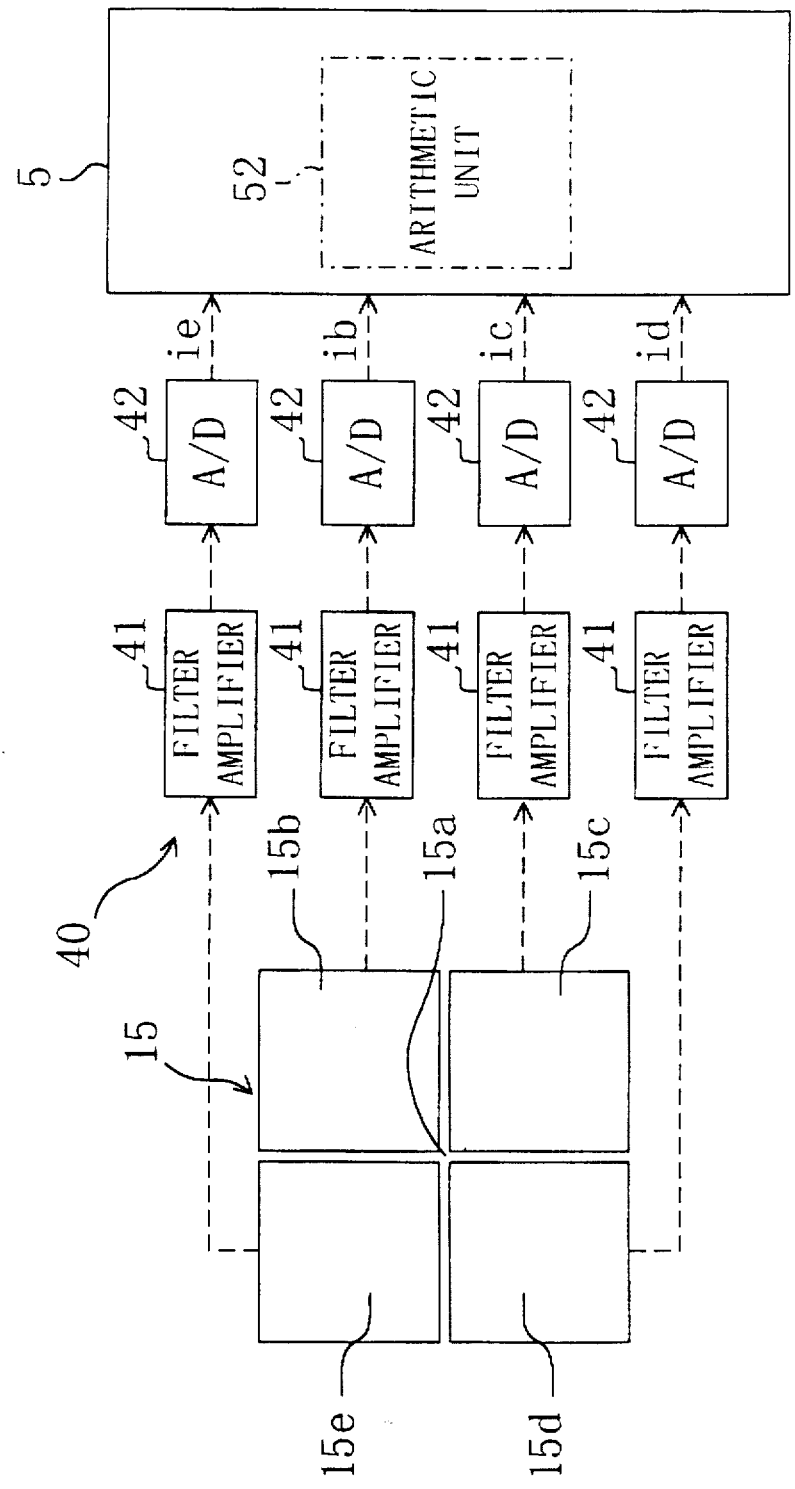

1

PHOTOELECTRIC DISPLACEMENT DETECTOR HAVING MOVABLE DETECTING ELEMENTS

BACKGROUND OF THE INVENTION

1. Technical Field of the Invention

The present invention relates to a photoelectric displacement detector which receives reference light so as to detect the amount of displacement of a measuring object (an object that is measured) by using, as a basis for measurement, a light receiving position where the reference light is received. The present invention pertains in particular to a photoelectric displacement detector for measuring the amount of settling and the amount of inclination of a tank which vary with the amount of a substance, such as liquid and gas, held in the tank, for measuring the amount of strain and the amount of settling of a building and for measuring the amount of settling of a ground.

2. Description of Related Art

It is known in the art that, in measurement of the amount of strain of a building or in measurement of the amount of settling of a ground, reference laser light is given off from a laser aligner and the survey operator then determines the amount of displacement of a measuring object by making use of the laser light as a reference for measurement. In other words, the survey operator, who has visually confirmed a beam spot of the laser light, places a mark on the measuring object to the center of the beam spot and measures the position of the measuring object by making use of the mark as a reference for measurement. This measurement technique is also employed to determine the amount of shift from the vertical lines of pillars and walls of a building under construction, to determine the amount of strain of a completed building and to determine the amount of displacement of a bridge.

The above-described instrumentation technique, however, has some drawbacks. For example, the use of a beam spot of laser light from a laser aligner as a measurement reference produces the problem that, although it is required to find an exact beam spot center, the beam spot expands as the distance between the laser aligner and a measuring object increases. It is therefore hard for the survey operator to visually find the beam spot center, resulting in poor measurement accuracy. To cope with such a problem, an arrangement, in which a reference laser light beam is detected using a light sensor or the like, may be employed. This arrangement, however, suffers from the problem that, since the survey operator carries out measurement work by making utilization of the center of a beam spot detected by the light sensor as a basic for measurement, the accuracy of measurement may vary with the difference in capability among individual survey operators or with the survey operator's physical conditions. Poor measurement accuracy may result.

SUMMARY OF THE INVENTION

Bearing in mind the above-described problems with the prior art techniques, the present invention was made. It is therefore an object of the present invention to provide an improved photoelectric displacement detector capable of determining a displacement of a measuring object at high accuracy with respect to reference light.

The present invention provides an improved photoelectric displacement detector comprising:

(a) a photoelectric conversion means with a light receiving surface for receiving reference light, the light receiving surface being divided into light receiving sub-surfaces;

2

(b) a light quantity difference detection means for detecting, based on output signals from the light receiving sub-surfaces, a difference in the quantity of received light between the light receiving sub-surfaces;

(c) a linear motion mechanism for supporting the photoelectric conversion means such that the photoelectric conversion means is linearly movable;

(d) a drive means for driving the linear motion mechanism so as to shift the photoelectric conversion means;

(e) a control means for controlling the drive means in order that the received light quantity difference, detected by the light quantity difference detection means, is cancelled to zero; and (f) a measurement means for measuring the amount of motion of the photoelectric conversion means at the time when the received light quantity difference is cancelled to zero.

In accordance with the above-described photoelectric displacement detector of the present invention the amount of displacement of a measuring object with respect to a reference light beam can be determined automatically. More specifically, the photoelectric displacement detector, described above, is first fixed to a measuring object and reference light is sent to the photoelectric conversion means so that the light receiving sub-surfaces receive the same quantity of light. If the measuring object is then displaced, this causes the light receiving sub-surfaces to receive different quantities of light. Each light receiving sub-surface, as a result, provides a signal corresponding to its received light quantity. The light quantity difference detection means detects, based on the output signals from the light receiving sub-surfaces, a difference in received light quantity between the light receiving sub-surfaces. The drive means is controlled by the control means such that the received light quantity difference is cancelled to zero and the photoelectric conversion means is shifted by the linear motion mechanism to such an extent that the light receiving sub-surfaces receive the same quantity of light. The measurement means determines the amount of motion of the photoelectric conversion means by the linear motion mechanism. The photoelectric conversion means is kept at the same position relatively to the aforesaid reference light and, therefore, the value determined by the measurement means becomes equal to the amount of displacement of the measuring object on the basis of the reference light. As a result, the amount of displacement of a measuring object can be determined automatically at high accuracy with no survey operators involved.

It may be arranged in the aforesaid photoelectric displacement detector that:

(a) the light receiving surface is divided at least into upper and lower light receiving sub-surfaces, with a reference light receiving position defining a boundary between the upper light receiving sub-surfaces and the lower light receiving sub-surfaces;

(b) the light quantity difference detection means includes a vertical light quantity difference detection part for detecting a difference between a sum of the quantities of light received in the upper light receiving sub-surfaces located above the reference light receiving position and a sum of the quantities of light received in the lower light receiving sub-surfaces located below the reference light receiving position;

(c) the linear motion mechanism includes a vertical motion mechanism for vertically shifting the photoelectric conversion means;

(d) the drive means includes a motor for driving the vertical motion mechanism; and (e) the measurement means includes a vertical displacement measurement part for measuring the amount of vertical motion of the photoelectric conversion means by the vertical motion mechanism.

Accordingly, in the photoelectric conversion means that is irradiated with reference light, the upper light receiving sub-surfaces arranged above the reference light receiving position and the lower light receiving sub-surfaces arranged below the reference light receiving potion provide respective electric currents corresponding to their respective received light quantities. The electric currents are fed to the vertical light quantity difference detection means. In the vertical light quantity difference detection means, a difference between a sum of the quantities of light received in the upper light receiving sub-surfaces and a sum of the quantities of light received in the lower light receiving sub-surfaces is detected. The control means controls the operation of the motor in order that the difference is cancelled to zero. The photoelectric conversion means is moved vertically by the vertical motion mechanism in order that the conversion means is kept at the same level relatively to the reference light. The amount of vertical motion of the photoelectric conversion means by the vertical motion mechanism is determined by the measurement means. As a result of such arrangement, the amount of vertical displacement of a measuring object on the basis of the reference light can be determined automatically at high accuracy.

It may be arranged in the aforesaid photoelectric displacement detector that:

(a) the light receiving surface is divided at least into left- and right-hand side light receiving sub-surfaces, with a reference light receiving position defining a boundary between the left-hand side light receiving sub-surfaces and the right-hand side light receiving sub-surfaces;

(b) the light quantity difference detection means includes a horizontal light quantity difference detection part for detecting a difference between a sum of the quantities of light received in the left-hand side light receiving sub-surfaces located on the left side of the reference light receiving position and a sum of the quantities of light received in the right-hand side light receiving sub-surfaces located on the right side of the reference light receiving position;

(c) the linear motion mechanism includes a horizontal motion mechanism for horizontally shifting the photoelectric conversion means;

(d) the drive means includes a motor for driving the horizontal motion mechanism; and (e) the measurement means includes a horizontal displacement measurement part for measuring the amount of horizontal motion of the photoelectric conversion means by the horizontal motion mechanism.

Accordingly, in the photoelectric conversion means that is irradiated with reference light, the left-hand side light receiving sub-surfaces arranged on the left side of the reference light receiving position and the right-hand side light receiving sub-surfaces arranged on the right side of the reference light receiving potion provide respective electric currents corresponding to their respective received light quantities. The electric currents are fed to the horizontal light quantity difference detection means. In the horizontal light quantity difference detection means, a difference between a sum of the quantities of light received in the left-hand side light receiving sub-surfaces and a sum of the quantities of light received in the right-hand side light receiving sub-surfaces is detected. The control means controls the operation of the motor in order that the difference is cancelled to zero. The photoelectric conversion means is moved horizontally by the horizontal motion mechanism in order that the photoelectric conversion means is kept at the same horizontal position relatively to the reference light. The amount of horizontal motion of the photoelectric conversion means by the horizontal motion mechanism is determined by the measurement means. As a result of such arrangement, the amount of horizontal displacement of a measuring object on the basis of the reference light can be determined automatically at high accuracy.

It is preferred that the aforesaid photoelectric displacement detector further comprises a home position detection means for detecting the home position of the vertical motion mechanism and that the vertical displacement measurement part measures the amount of vertical displacement of the photoelectric conversion means on the basis of the home position of the vertical motion mechanism detected.

The home position of the vertical motion mechanism is detected by the home position detection means and the amount of vertical motion of the photoelectric conversion means is determined by reference to the home position.

It is preferred that the aforesaid photoelectric displacement detector further comprises a home position detection means for detecting the home position of the horizontal motion mechanism and that the horizontal displacement measurement part measures the amount of horizontal displacement of the photoelectric conversion means on the basis of the home position of the horizontal motion mechanism detected.

The home position of the horizontal motion mechanism is detected by the home position detection means and the amount of horizontal motion of the photoelectric conversion means is determined by reference to the home position.

It is preferred that the aforesaid photoelectric displacement detector further comprises a memory means for storing measured values determined by the measurement means.

Accordingly, the amount of motion of the photoelectric conversion means determined by the measurement means, i.e., the amount of displacement of a measuring object for the reference light can be stored in the memory means. As a result of such arrangement, unmanned, long-term displacement of an object to be measured becomes possible.

It is preferred that the aforesaid photoelectric displacement detector further comprises a transmission means for transmitting measured values determined by the measurement means to an external device.

Accordingly, the amount of motion of the photoelectric conversion means determined by the measurement means, i.e., the amount of displacement of a measuring object for the reference light can be transmitted by means of the transmission means to an external device. This makes it possible to obtain data about the amount of displacement of the object at a remote location. If many photoelectric displacement detectors are fixed to a large measuring object such as a building and if measured values found by the detectors are fed to a single external device, then these measured values can be batch-controlled with ease.

BRIEF DESCRIPTION OF THE DRAWINGS

FIG. 8 shows the structure of a light quantity difference detection means of the second embodiment.

EMBODIMENTS OF THE INVENTION

With reference to the accompanying drawing figures, preferred embodiments of the present invention are now described below.

First Embodiment of the Invention

Figure 1:
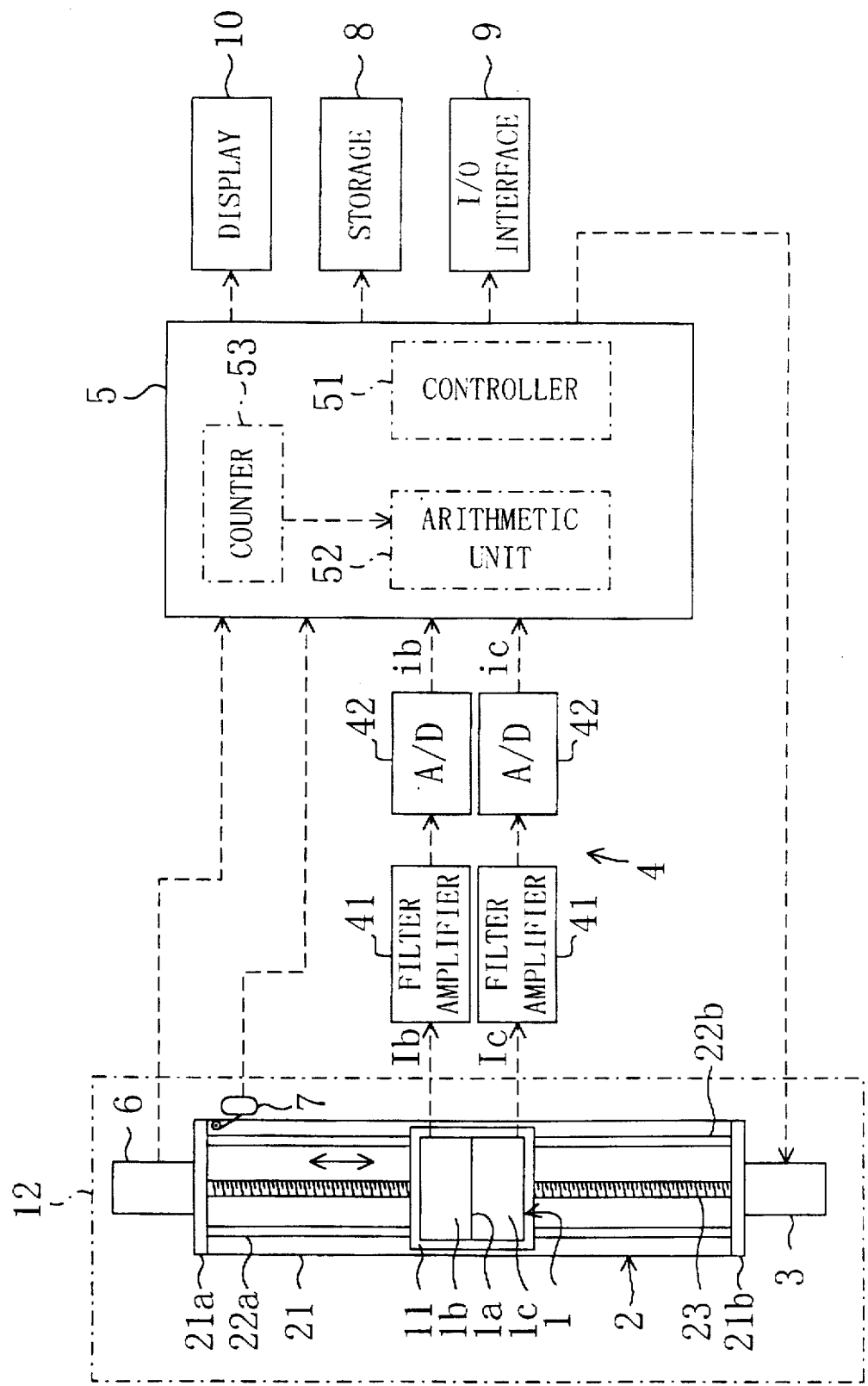
FIG. 1 shows a photoelectric displacement detector made in accordance with a first embodiment of the present invention.

Referring first to FIG. 1, a photoelectric displacement detector of a first embodiment of the present invention is illustrated. 1 is a light receiving part. This light receiving part 1 includes a pair of solar battery panels 1b and 1c each of which functions as a photoelectric conversion means. 2 is a vertical motion mechanism for vertically shifting the light receiving part 1. 3 is a motor for driving the vertical motion mechanism 2. 4 is a vertical light quantity difference detection (VLQDD) part for detecting a difference between the quantity of light received in the solar battery panel 1b and the quantity of light received in the solar battery panel 1c. 5 is a central processing unit (CPU) which functions as a control means for controlling the operation of the motor 3. 6 is a rotary encoder which functions as a vertical displacement measurement means for determining the amount of displacement of the light receiving part 1. 7 is a limit switch which functions as a home position detection means. 8 is a storage means for storing the amounts of motion of the light receiving part 1. 9 is an input/output (I/O) interface part which functions as a transmission means. 10 is a display part for displaying data such as measured values.

The light receiving part 1 includes a column-like movable table 11 (see FIG. 2) and the aforesaid paired solar battery panels 1b and 1c disposed at the front of the movable table 11. The solar battery panels 1b and 1c are vertically aligned adjacent to each other, with a reference light receiving position 1a defining a boundary therebetween. The solar battery panels 1b and 1b together form a light receiving surface. Each solar battery panel 1b and 1c provides a respective electric current corresponding to the quantity of the received light.

The vertical motion mechanism 2 for up/down motion includes a support plate 21 which is fixed to the body of an apparatus 12, and a pair of bents 21a and 21b. The bent 21a is formed such that it extends from the upper end of the support plate 21 in a perpendicular direction to the support plate 21. Likewise, the bent 21b is formed such that it extends from the lower end of the support plate 21 in a perpendicular direction to the support plate 21. The bents 21a and 21b face each other. A pair of guide rails 22a and 22b and a feed screw 23 are provided in such a way as to extend from the bent 21a down to the bent 21b in parallel relation with the support plate 21. The guide rails 22a, 22b and the feed screw 23 pass through the movable table 11. The movable table 11 engages with the feed screw 23 so that the movable table 11 moves vertically when the feed screw 23 is rotated. The motor 3 is disposed on the bent 21b to drive and rotate the feed screw 23.

The solar battery panel 1b provides an electric current Ib. The solar battery panel 1c, on the other hand, provides an electric current Ic. Filter amplifiers 41 and 41 of the VLQDD part 4 amplify the electric currents Ib and Ic, respectively. A/D converters 42 and 42 of the VLQDD part 4 then convert these amplified electric currents Ib and Ic into a digital signal ib and into a digital signal ic, respectively. The digital signals ib and ic are then fed to the CPU 5. The CPU 5 has an arithmetic unit 52. The arithmetic unit 52 performs a subtraction operation of subtracting the digital signal ic from the digital signal ib to find a subtraction value $\Delta i$. Based on the subtraction value $\Delta i$ found by the arithmetic unit 52, the VLQDD part 4 detects a difference between the quantity of light received in the solar battery panel 1b and the quantity of light received in the solar battery panel 1c.

The CPU 5 is constructed as follows. Based on the subtraction value $\Delta i$ computed by the arithmetic unit 52, a control unit 51 of the CPU 5 controls the operation of the motor 3. More specifically, when the subtraction value $\Delta i$ is positive, the motor 3 is controlled to rotate in a forward direction, whereby the movable table 11 moves downwardly. On the other hand, the subtraction value $\Delta i$ is negative, the motor 3 is controlled to rotate in a reverse direction, whereby the movable table 11 goes upwardly. In other words, the CPU 5 controls the light receiving part 1 to descend when the quantity of light received in the upper solar battery panel 1b is found to be greater than the quantity of light received in the lower solar battery panel 1c, while on the other hand when the lower solar battery panel 1c receives more light than the upper solar battery panel 1b the CPU 5 controls the light receiving part 1 to ascend. As a result of such arrangement, the difference between the quantity of light received by the solar battery panel 1b and the quantity of light received by the solar battery panel 1c is constantly cancelled to zero.

The rotary encoder 6 is mounted on the bent 21a of the support plate 21. The rotary encoder 6 is constructed such that it provides a pulse signal corresponding to the rotation angle of the feed screw 23. A counter 53, built in the CPU 5, counts the number of pulse signals from the rotary encoder 6. The arithmetic unit 52 computes the amount of vertical motion of the movable table 11 on the basis of a count value generated by the counter 53. The limit switch 7 is disposed adjacent to the bent 21a of the support plate 21. When the movable table 11 is at its mechanical home position which is located at the upper end of the support plate 21, the limit switch 7 makes contact with a side of the movable table 11 and turns on.

Figure 4:
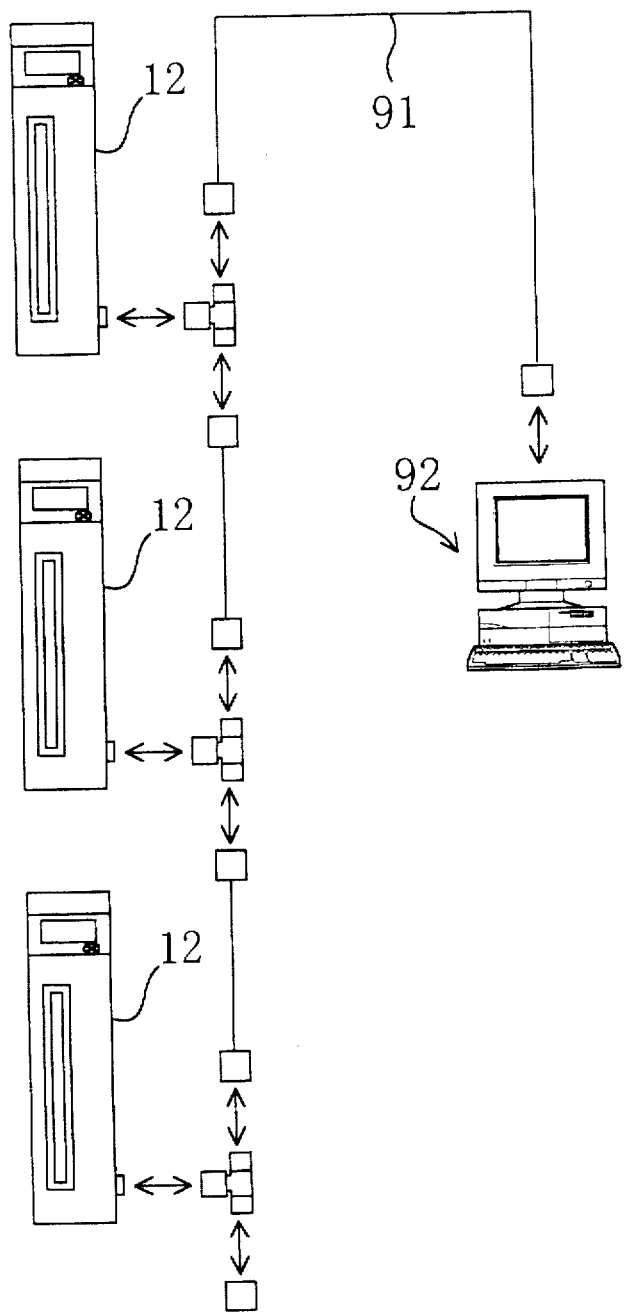
FIG. 4 shows an example case of batch-controlling measured values determined by a plurality of photoelectric displacement detectors.
Figure 5:
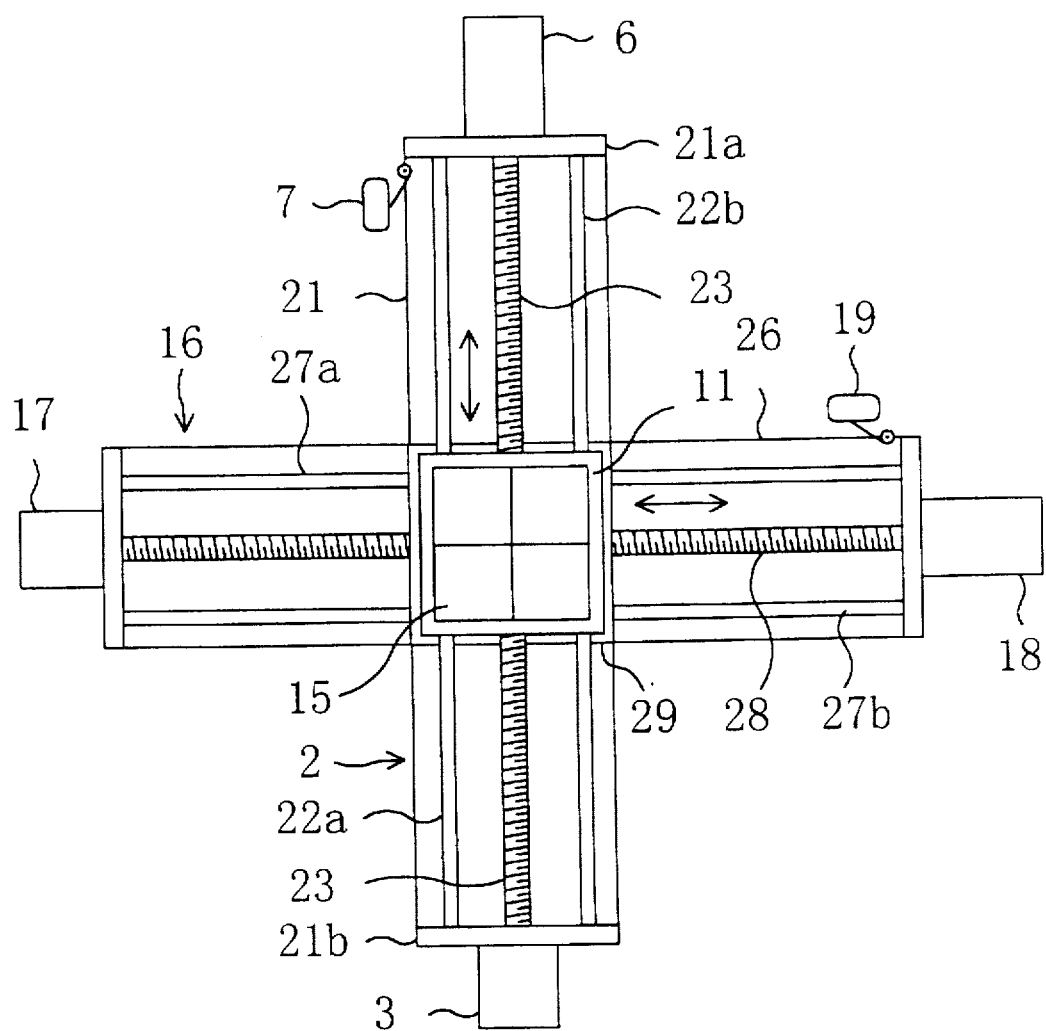
FIG. 5 shows a light receiving part and a linear motion mechanism, when viewed from the front, of a second embodiment of the present invention.
Figure 6:
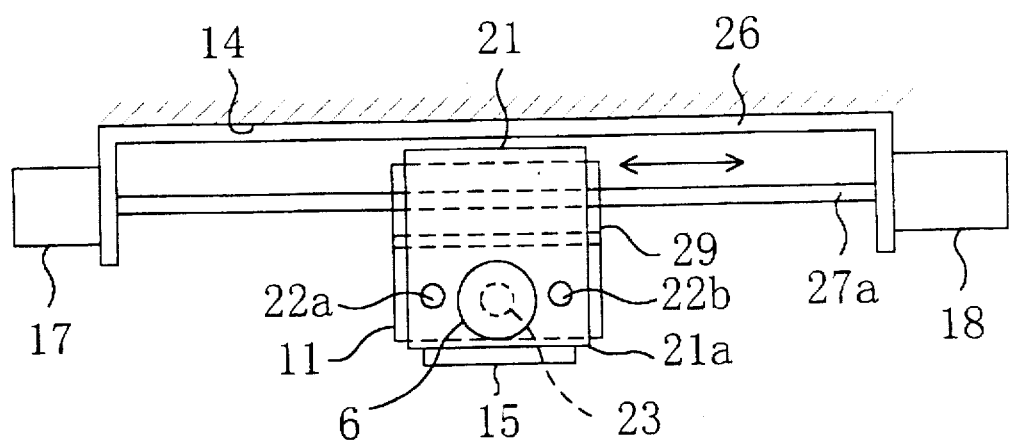
FIG. 6 shows the light receiving part and the linear motion mechanism of FIG. 5, when viewed from the top.
Figure 7:
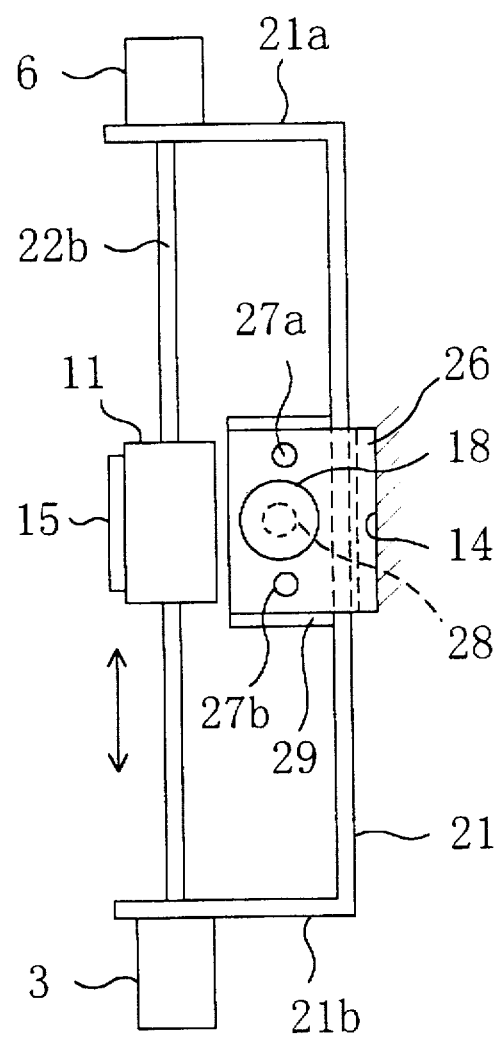
FIG. 7 shows the light receiving part and the linear motion mechanism of FIG. 5, when viewed from the right-hand side.

The storage means 8 comprises a storage means such as a hard-disk drive and a semiconductor memory. The storage means 8 stores, at constant time intervals, a value calculated by the arithmetic unit 52 of the CPU 5 as the amount of motion of the movable table 11. The I/O interface part 9 transmits the aforesaid measured value to, for example, a personal computer (PC) 92 (see FIG. 4) as an external device, by way of a communication cable 91.

A way of how the photoelectric displacement detector of the first embodiment works, together with its operation and effects, is now described below.

Figure 2:
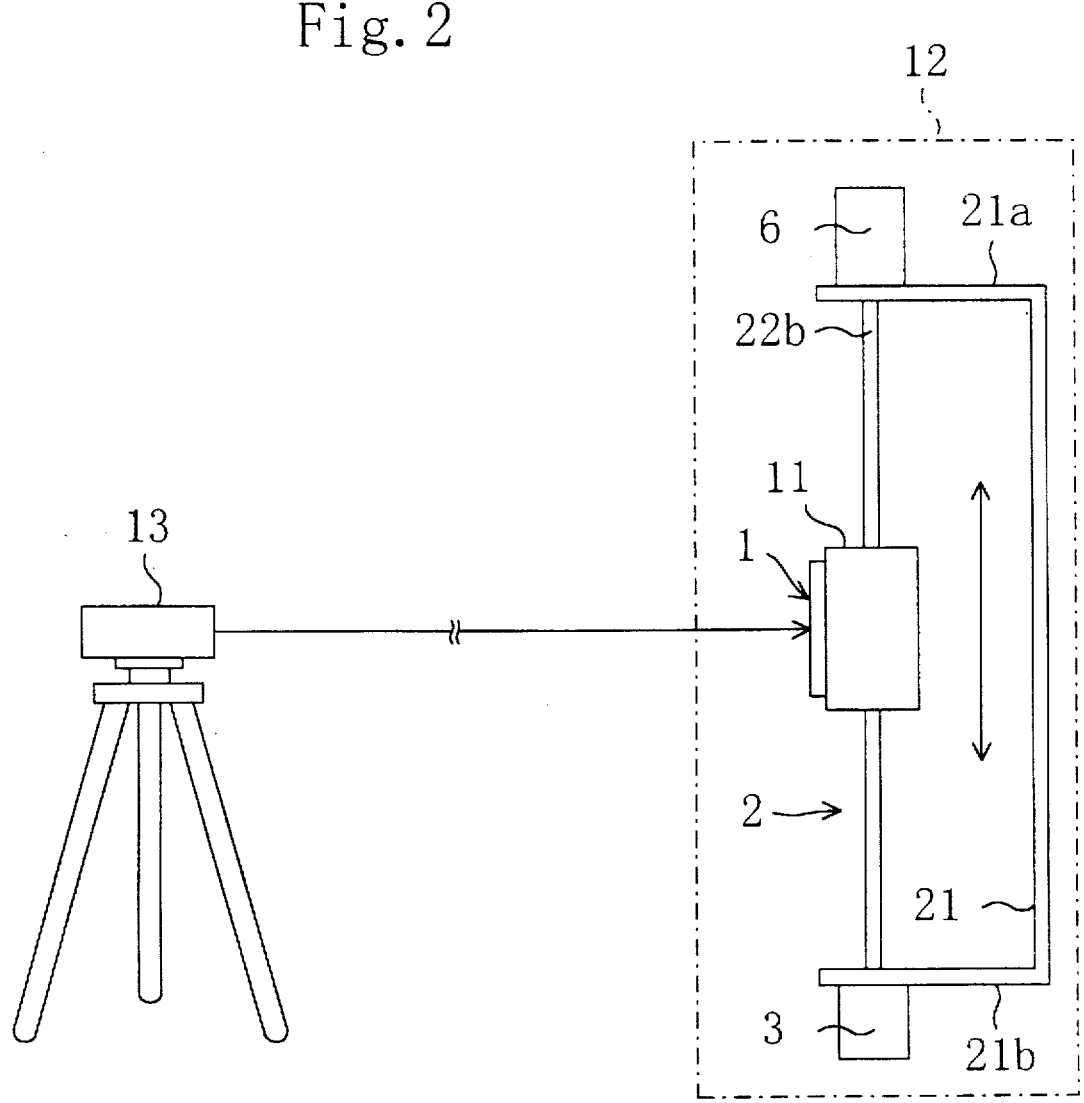
FIG. 2 shows a light receiving part and a linear motion mechanism when viewed from the right-hand side.

The apparatus body 12 is first fixed to a measuring object (i.e., an object to be measured) and laser light indicative of a reference level is horizontally sent from a rotatable laser device 13 (see FIG. 2). Thereafter, the position of the rotatable laser device 13 is adjusted to change the height of the reference level in order that the beam spot A of the laser light horizontally passes along the reference light receiving position 1a of the light receiving part 1. as shown by solid line of FIG. 3. The counter 53 is reset by a counter reset switch (not shown) to zero.

Figure 3:
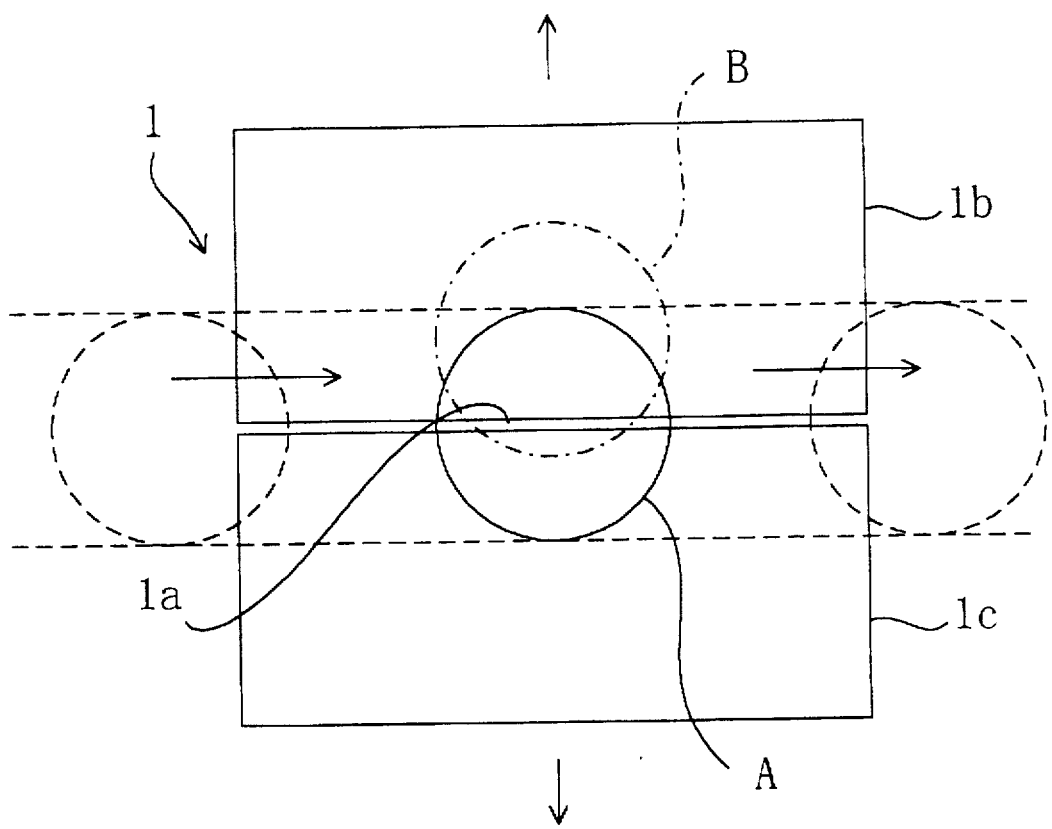
FIG. 3 is a schematic showing variations in light receiving condition due to a displacement of a measuring object.

If the measuring object is then displaced downwardly, this causes the path of the beam spot to be displaced upwardly in relation to the light receiving part 1. as shown by imaginary line of FIG. 3. As a result of such a displacement, the quantity of light received in the solar battery panel 1b increases while on the other hand the quantity of light received in the solar battery panel 1c decreases. For this reason, a signal value ib (i.e., the value of a signal which is applied from the solar battery panel 1b to the CPU 5 through the corresponding filter amplifier 41 and A/D converter 42) increases, and a signal value ic (i.e., the value of a signal which is applied from the solar battery panel 1c to the CPU 5 through the corresponding filter amplifier 41 and A/D converter 42) decreases. Based on the subtraction value $\Delta i$ as a result of subtracting the signal value ic from the signal value ib, the CPU 5 controls the motor 3 to rotate in a forward direction since the subtraction value $\Delta i$ is positive in this case, whereby the movable table 11 moves downwardly until the difference between the quantity of light received by the solar battery panel 1b and the quantity of light received by the solar battery panel 1c is cancelled to zero. At the same time, the number of pulse signals provided from the rotary encoder 6 is counted by the counter 53 and, based on the count value, the amount of vertical motion of the movable table 11, i.e., the amount of displacement of the measuring object, is computed wherein the laser light is used as a measurement reference.

Displacement of a measuring object is not manually determined by a survey operator but is determined automatically. The accuracy of displacement measurement is no longer influenced by the difference in capability among individual survey operators or by the physical conditions of individual survey operators. High-accuracy measurement can be achieved. Additionally, if it is arranged such that the memory means 8 automatically stores the amounts of motion of the movable table 11 found by the arithmetic unit 52, this makes it possible to automatically record very small displacements of a measuring object for a long period of time, thereby facilitating, for example, long-term ground subsidence measurement.

The amount of motion of the movable table 11 may be fed by the I/O interface unit 9 to the personal computer 92 through the communication cable 91 so that the amount of displacement of a measuring object can be obtained at a remote place. In addition, for the case of a measuring object that is great in size such as a building, a number of photoelectric displacement detectors 12 may be disposed at a corresponding number of locations (see FIG. 4), which makes it possible to simultaneously measure displacements at the locations, and measured values are fed to the personal computer 92 for batch control. Furthermore, it is possible to detect from an ON signal from the limit switch 7 that the movable table 11 is located at its mechanical home position, whereby the counter can be reset in such a state that the movable table 11 is located at the home position. The amount of motion of the light receiving part 1 can be measured in which the mechanical home position is used as a reference for measurement.

Second Embodiment of the Invention

A second embodiment of the present invention is now illustrated by making reference to FIG. 5 through FIG. 8.

15 is a light receiving part. 16 is a horizontal motion mechanism for shifting the light receiving part 15 in a horizontal direction. 17 is a motor for driving the horizontal motion mechanism 16. 18 is a rotary encoder which functions as a horizontal displacement measurement means for measuring the amount of horizontal motion of the light receiving part 15. 19 is a limit switch which functions as a home position detection means for detecting a horizontal mechanical home position. 40 of FIG. 8 is a light quantity difference detection means.

The light receiving part 15 includes a column-like movable table 11 (see FIGS. 6 and 7), and four solar battery panels 15b, 15c, 15d and 15e which function as photoelectric conversion means and which are arranged at the front of the movable table 11 (see FIG. 8). The four solar battery panels 15b–e are approximately square in shape and are disposed around a reference light receiving position 15a so as to together form an approximately square light receiving surface (see FIG. 5). More specifically, in the light receiving surface, the panel 15b is an upper right-hand subsurface, the panel 15c is a lower right-hand subsurface, the panel 15d is a lower left-hand subsurface and the panel 15e is an upper left-hand subsurface. Each of the solar battery panels 15b–e receives light and provides a corresponding electric current to the quantity of the light received.

The horizontal motion mechanism 16 laterally shifts the entire vertical motion mechanism 2. The horizontal motion mechanism 16 is identical in structure with the vertical motion mechanism 2, in other words the horizontal motion mechanism 16 includes a support plate 26 extending laterally and fixed to an apparatus body 14 (see FIGS. 6 and 7), a pair of guide rails 27a and 27b and a feed screw 28. The guide rails 27a and 27b and the feed screw 28, which run parallel with the support plate 26, horizontally pass through a movable table 29 mounted on the center of the support plate 21 of the vertical motion mechanism 2. The feed screw 28 is engaged with the movable table 29 so that when the feed screw 28 rotates the vertical motion mechanism 2 is shifted laterally together with the movable table 29. The motor 17, disposed on a bent located on the right side of the support plate 26, is a motor for driving the feed screw 28 to rotate.

The light quantity difference detection means 40 comprises a vertical light quantity difference detection (VLQDD) part and a horizontal light quantity difference detection (HLQDD) part. The VLQDD part, on one hand, detects the vertical light quantity difference between a sum of the quantities of light received in the panels 15b and 15e located above the reference light receiving position 15a and a sum of the quantities of light received in the panels 15c and 15d located below the reference light receiving position 15a. The HLQDD part, on the other hand, detects the horizontal light quantity difference between a sum of the quantities of light received in the panels 15d and 15e located on the left-hand side of the reference light receiving position 15 and a sum of the quantities of light received in the panels 15b and 15c located on the right-hand side of the reference light receiving position 15a.

The solar battery panels 15b, 15c, 15d and 15e provide electric currents Ib, Ic, Id and Ie, respectively. These currents Ib–e are fed, via respective filter amplifiers 41 and A/D converters 42, to the CPU 5 as a signal ib, as a signal ic, as a signal id and as a signal ie. The arithmetic unit 52 of the CPU 5 then performs, based on the signals ib–c, the following arithmetic operation.

$\Delta i1$ (subtraction value)$=(ib+ie)-(ic+id)$

The VLQDD part detects, based on the subtraction value Δi1, a vertical light quantity difference.

Like the VLQDD part, the HLQDD part detects, based on Δi2 (i.e., the subtraction value found by the arithmetic unit 52 of the CPU 5 according to the following arithmetic operation), a horizontal light quantity difference.

$$\Delta i2 \text{ (subtraction value)} = (id+ie)-(ib+ic)$$

The CPU 5 controls, based on the subtraction values Δi1 and Δi2 found by the arithmetic unit 52, the operation of the motors 3 and 17 with the aid of the control unit 51, to shift the light receiving part 1 in horizontal and vertical directions in order that the solar battery panels 15b–c receive the same quantity of light.

The remaining structure of the second embodiment is not described here since it is the same as the one described in the first embodiment. Like reference numerals have been used to indicate like elements.

In the second embodiment, the apparatus body 14 is first fixed to a measuring object and laser light indicative of a reference level is given off from a laser aligner or the like towards the reference light receiving position 15a of the light receiving part 15. It is arranged such that the solar battery panels 15b–e receive the same quantity of light. When the measuring object makes a displacement thereby causing the panels 15b–e to receive different quantities of light, the light receiving part 15 is vertically shifted by the vertical motion mechanism 2, as in the first embodiment, in order that the resulting vertical light quantity difference is cancelled to zero, while at the same time the horizontal motion mechanism 16 horizontally shifts the light receiving part 15 in order that the resulting horizontal light quantity difference is cancelled to zero. As a result of such arrangement, the laser light is always received at the same position, that is, the reference light receiving position 15a. The amount of vertical motion of the light receiving part 15 is determined on the basis of a pulse signal from the rotary encoder 6 and the amount of horizontal motion of the light receiving part 15 is determined on the basis of a pulse signal from the rotary encoder 18. By making utilization of the laser light as a measurement reference, it becomes possible to measure the amount of vertical displacement and the amount of horizontal displacement of a measuring object at the same time. Additionally, the inclination of the measuring object can be measured.

Other Embodiments of the Invention

It is to be noted that the present invention is not limited to the first and second embodiments only. In the first embodiment the vertical motion mechanism 2 is used as a linear motion mechanism and in the second embodiment the horizontal motion mechanism 16 is employed in addition to the vertical motion mechanism 2. A linear motion mechanism, which is inclined by an angle of 45 degrees from the horizontal direction, may be used.

In the first embodiment the solar battery panels 1b and 1c are employed and in the second embodiment the solar battery panels 15b–e are employed. Different light receiving elements other than the above type may be used.

In the first embodiment the light receiving surface of the light receiving part 1 is divided into two sections, namely the upper and lower sections, and in the second embodiment the light receiving surface of the light receiving part 15 is divided into four sections, namely the upper right-hand subsurface, the lower right-hand subsurface, the lower left-hand subsurface and the upper left-hand subsurface. The light receiving surface may be divided into six or more subsurfaces.

Each of the light receiving surfaces of the light receiving parts 1 and 15 in the first and second embodiments is divided in a direction perpendicular to the direction in which each light receiving part 1, 15 moves. The light receiving surface may be divided in a direction that inclines an angle of 45 degrees with respect to the direction in which the light receiving part moves.

In the first embodiment reference laser beams are given off from the rotatable laser device 13. Instead of using the rotatable laser device 13, a modulated laser device may be used.

As described above, the present invention can find applications in measuring strain and settling of a building, in measuring settling and inclination of a tank and in measuring settling of a ground. In addition the present invention may be used to measure a very small strain of a railway and to measure the amount of shift from a tunnel drilling direction. The present invention finds applications in particular in cases where long-term, unmanned measurement on ground settling or strain measurement on a number of locations of a large building is required.

The invention claimed is:

1. A photoelectric displacement detector comprising:
   (a) photoelectric conversion means with a light receiving surface for receiving reference light, said light receiving surface being divided into light receiving sub-surfaces;
   (b) light quantity difference detection means for detecting, based on output signals from said light receiving sub-surfaces, a difference in the quantity of received light between said light receiving sub-surfaces;
   (c) a linear motion mechanism for supporting said photoelectric conversion means such that said photoelectric conversion means is linearly movable;
   (d) drive means for driving said linear motion mechanism so as to shift said photoelectric conversion means;
   (e) control means for controlling said drive means in order that said received light quantity difference, detected by said light quantity difference detection means, is cancelled to zero; and
   (f) measurement means for measuring the amount of motion of said photoelectric conversion means at the time when said received light quantity difference is cancelled to zero.

2. A photoelectric displacement detector according to claim 1,
wherein:
   (a) said light receiving surface is divided at least into upper and lower light receiving sub-surfaces, with a reference light receiving position defining a boundary between said upper light receiving sub-surfaces and said lower light receiving sub-surfaces;
   (b) said light quantity difference detection means includes a vertical light quantity difference detection part for detecting a difference between a sum of the quantities of light received in said upper light receiving sub-surfaces located above said reference light receiving position and a sum of the quantities of light received in said lower light receiving sub-surfaces located below said reference light receiving position;
   (c) said linear motion mechanism includes a vertical motion mechanism for vertically shifting said photoelectric conversion means;

(d) said drive means includes a motor for driving said vertical motion mechanism; and (e) said measurement means includes a vertical displacement measurement part for measuring the amount of vertical motion of said photoelectric conversion means by said vertical motion mechanism.

3. A photoelectric displacement detector according to claim 1, wherein:

(a) said light receiving surface is divided at least into left- and right-hand side light receiving sub-surfaces, with a reference light receiving position defining a boundary between said left-hand side light receiving sub-surfaces and said right-hand side light receiving sub-surfaces;

(b) said light quantity difference detection means includes a horizontal light quantity difference detection part for detecting a difference between a sum of the quantities of light received in said left-hand side light receiving sub-surfaces located on the left side of said reference light receiving position and a sum of the quantities of light received in said right-hand side light receiving sub-surfaces located on the right side of said reference light receiving position;

(c) said linear motion mechanism includes a horizontal motion mechanism for horizontally shifting said photoelectric conversion means;

(d) said drive means includes a motor for driving said horizontal motion mechanism; and (e) said measurement means includes a horizontal displacement measurement part for measuring the amount of horizontal motion of said photoelectric conversion means by said horizontal motion mechanism.

4. A photoelectric displacement detector according to claim 2 wherein said photoelectric displacement detector further comprises home position detection means for detecting the home position of said vertical motion mechanism and wherein said vertical displacement measurement part measures the amount of vertical displacement of said photoelectric conversion means on the basis of the home position of said vertical motion mechanism detected.

5. A photoelectric displacement detector according to claim 3 wherein said photoelectric displacement detector further comprises home position detection means for detecting the home position of said horizontal motion mechanism and wherein said horizontal displacement measurement part measures the amount of horizontal displacement of said photoelectric conversion means on the basis of the home position of said horizontal motion mechanism detected.

6. A photoelectric displacement detector according to claim 1 further comprising memory means for storing measured values determined by said measurement means.

7. A photoelectric displacement detector according to claim 1 further comprising transmission means for transmitting measured values determined by said measurement means to an external device.

* * * * *